Z. B. SIMS.

Cotton Plows.

No. 5,513. Reissued July 29, 1873.

Attest;
A. H. Norris.
Edw. W. Dunn

Inventor;
Z. B. Sims
Per James L. Norris
atty.

A.M. PHOTO-LITHOGRAPHIC CO. N.Y. (OSBORNE'S PROCESS.)

UNITED STATES PATENT OFFICE.

ZACHARIAH B. SIMS, OF BONHAM, TEXAS.

IMPROVEMENT IN COTTON-PLOWS.

Specification forming part of Letters Patent No. 94,350, dated August 31, 1869; reissue No. 5,513, dated July 29, 1873; application filed April 21, 1871.

*To all whom it may concern:*

Figure 1:
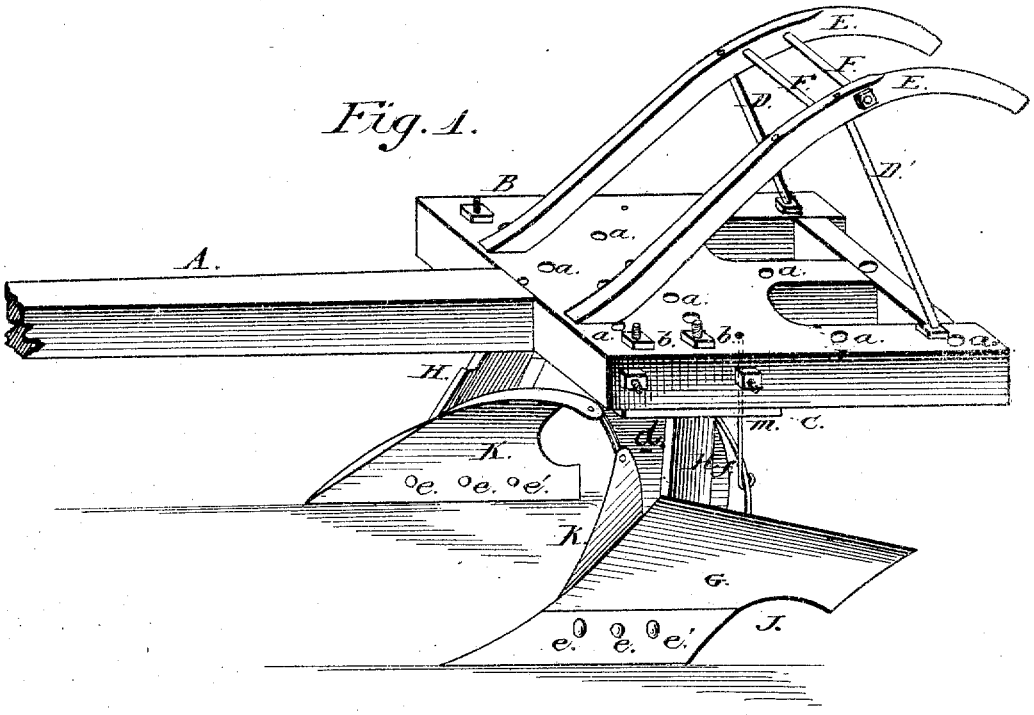
Figure 2:
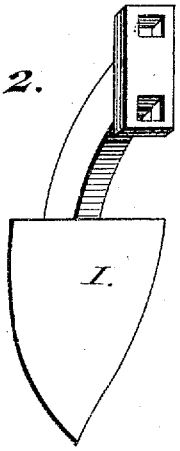

Be it known that I, ZACHARIAH B. SIMS, of Bonham, in the county of Fannin and State of Texas, have invented certain Improvements in Plows, of which the following is a specification:

In the accompanying drawings, Figure 1 is a perspective view of my invention; Fig. 2, a detached view, showing one of the plows.

The invention relates to certain improvements in cotton-plows, the construction of which is fully hereinafter described.

A represents the plow-beam, and B the frame, having the holes *a a a* made in it, into which the small ends of the shanks H H of the plows are made to pass, and which are secured in position by the nuts *b b*. The object of this arrangement is to adjust the plows G G nearer to or further from each other, or to adjust them from front to rear in the frame B. D D′ are braces connected with the handles E E by which the height of the handles can be regulated to suit the height of the plowman. The handles are connected together by the brace-rods F F. The mold-boards G G each have a curve in their lower and rear ends, which is to prevent them from clogging, particularly in stiff land, the surface of the mold-board being shorter in cross-section than in the ordinary mold-boards, while as wide and deep a furrow can be made. K K are curved flanges bolted or otherwise attached to the inner sides of the plow. To the upper ends of the curved flanges K K is secured an arched protector, *d*, provided at its rear end with flanges *f f* inclined toward the rear of the plow. This protector *d* is supported at its rear end by rods *m m* connected to the plow-frame B, as shown.

In Fig. 2 I represents a plow-tooth attached to the middle and rear end of the frame, and is designed to be employed in working between the cotton rows, the curved flanges K K and protector *d* being removed in this operation.

The plow with the curved flanges and protector attached is intended to be employed when the cotton or other plant is small, the curved flanges running near and straddling the plant and removing all grass, &c., from about it, while the protector *d* passes directly over the plant. By this means the dirt will be somewhat arched and thrown near the plant; any filth, &c., passing over the outer surfaces of the curved flanges will pass onto the curved protector, which prevents it from falling on the plant, but causes it to pass over the sides of the protector.

I claim as my invention—

1. The curved flanges K K combined with the plows G G, substantially as described.
2. The removable curved flanges K K adapted to be bolted or otherwise attached to the plows G G, substantially as set forth.
3. The plow-tooth I, in combination with the plows G G, constructed, arranged, and operating substantially as described.
4. The flanged protector *d*, in combination with the curved flanges K K, as and for the purpose specified.
5. The plows G G, in combination with the curved flanges K K and protector *d*, operating as set forth.

To the above I have signed my name this 21st day of April, 1871.

Z. B. SIMS.

Witnesses:

JAMES L. NORRIS,
W. J. PEYTON.